United States Patent
Bremnes

(10) Patent No.: US 8,005,324 B2
(45) Date of Patent: Aug. 23, 2011

(54) FAULT DETECTION SYSTEM

(75) Inventor: Jarle Jansen Bremnes, Fredrikstad (NO)

(73) Assignee: Nexans, Paris (FR)

( * ) Notice: Subject to any disclaimer, the term of this patent is extended or adjusted under 35 U.S.C. 154(b) by 0 days.

(21) Appl. No.: 12/223,474

(22) PCT Filed: Feb. 20, 2007

(86) PCT No.: PCT/IB2007/001113
§ 371 (c)(1), (2), (4) Date: Dec. 10, 2008

(87) PCT Pub. No.: WO2007/096775
PCT Pub. Date: Aug. 30, 2007

(65) Prior Publication Data
US 2009/0220188 A1  Sep. 3, 2009

(30) Foreign Application Priority Data
Feb. 21, 2006  (NO) .................................. 20060826

(51) Int. Cl.
*G02B 6/00* (2006.01)
(52) U.S. Cl. .......................................... 385/12; 385/13
(58) Field of Classification Search .................... 385/12, 385/101; 174/70, 102 R, 102 SC, 139 R
See application file for complete search history.

(56) References Cited

U.S. PATENT DOCUMENTS

| | | | |
|---|---|---|---|
| 6,559,437 B1 | 5/2003 | Pope et al. | 250/227.04 |
| 6,635,828 B2 * | 10/2003 | Lepley et al. | 174/139 |
| 2004/0100273 A1 | 5/2004 | Liney et al. | 324/534 |

FOREIGN PATENT DOCUMENTS

| | | |
|---|---|---|
| EP | 0539915 | 5/1993 |
| EP | 0603604 | 6/1994 |
| EP | 0825465 | 2/1998 |
| EP | 1469484 | 10/2004 |
| FR | 2633092 | 12/1989 |
| GB | 2373321 | 9/2002 |

OTHER PUBLICATIONS

International Search Report dated Sep. 24, 2007.

* cited by examiner

*Primary Examiner* — Sarah Hahm
(74) *Attorney, Agent, or Firm* — Sofer & Haroun, LLP

(57) ABSTRACT

A fault detection system for subsea pipeline DEH cable includes fiber optic element(s) (7) provided along the cable section concerned and located outside at least some of the cable insulation (2,3,4). The fiber optic element(s) are adapted to be influenced by fault inducing effects or damages to said cable section, so as to bring about an optical signal indicating a fault condition. The main feature of the invention is that said fiber optic element(s) (7) extend(s) inside a tubular, electrically conductive metal element (7a) adapted to melt down in the case of a fault current flowing therethrough as a result of damage to the cable insulation (2,3,4) at a point along said cable section.

7 Claims, 1 Drawing Sheet

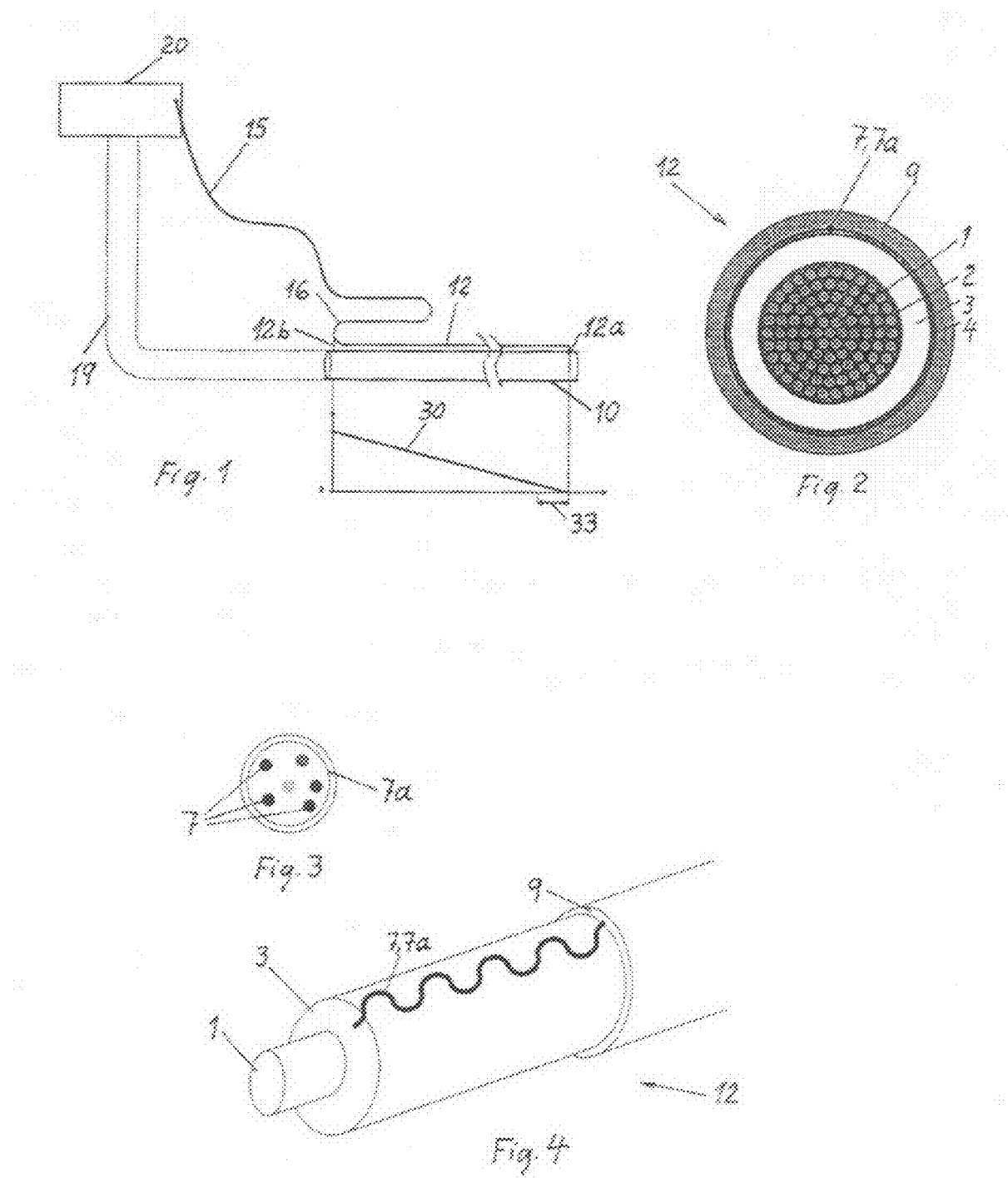

FAULT DETECTION SYSTEM

RELATED APPLICATIONS

This application is a National Phase application of PCT/IB2007/001113, filed on Feb. 20, 2007, which in turn claims the benefit of priority from Norwegian Patent Application No. 2006 0826, filed on Feb. 21, 2006, the entirety of which is incorporated herein by reference

FIELD OF THE INVENTION

For heating of oil or gas pipelines in order to prevent hydrate and ice formation on the pipeline walls, the present applicant has developed a direct electrical heating (DEH) system that is described, inter alia, in British patent specification No. 2.373.321. For current supply to such a heating system a common practise is to install a current supply cable as a so called "piggyback" cable, which is traditionally made simultaneously with the laying of the pipeline. More specifically such a cable is strapped to the pipeline during installation thereof.

This invention is intended to provide a means of fault detection in particular for the remote part of a single-core high voltage cable when used as a DEH "piggyback" cable.

BACKGROUND

The piggyback cable is intentionally connected to ground at its remote end, a fact that makes conventional detection of faults in that region extremely difficult. The piggyback cable has a linearly decreasing voltage, from an input value at its power in-feed end to zero at the grounded, remote end (see FIG. 1). Consequently, the electric field stress on the cable insulation also decreases linearly, from a normal operating stress at the power in-feed end to zero at the remote end.

A cable fault in the remote region may be initiated by a mechanical damage, e.g. a cut extending through the outer sheath and the insulation system, thus exposing the copper conductor to seawater. As the conductor is connected to ground at the remote end, the fault will shunt its remaining length from fault location to grounded end. The corresponding change in conductor current will be minute and extremely difficult to detect at the opposite end of the piggyback cable. In most practical installations, the current measurement will be done even further upstream, making small changes even harder to detect. The conductor current in a DEH system is typically larger than 1,000 A, and a fault current of 10 A (through the physical fault) will translate into a far smaller change at the in-feed end (due to phase shifting). Even with the best available current measuring equipment, cable faults near the remote end will therefore pass on undetected.

An electric current flowing out from the surface of a copper conductor and into seawater will cause rapid (a.c.) corrosion of the copper conductor, even at small current levels or voltage differences. If such a fault goes undetected, the final outcome will be a complete corrosion break of the copper conductor. A seawater filled gap is thus introduced between the two "conductor stubs", but the electric impedance of this gap may not be sufficiently large to cause a detectable change in current at the in-feed end of the DEH system. As the gap will not be capable of withstanding the source voltage, an electric arc is then formed between the two "conductor stubs". The temperature associated with such arcing is several thousand degrees Celsius, so a rapid meltdown of the copper conductor as well as any polymer in the vicinity will occur. The boiling temperature of seawater at most relevant water depths will be above the polymer melting points, so "water cooling" will not prevent the described melt-down from taking place.

The piggyback cable is commonly placed as close to the thermally insulated pipeline as possible, as this yields optimum DEH system efficiency. The pipeline's thermal insulation will thus also be melted down by a fault as described above. Once the steel pipeline is exposed to seawater it will appear as an alternative, and probably low-impedance, return path for the fault current. As the copper conductor is continuously eroded away and widening the gap between the "stubs", the pipeline will at some point in time become the lowest impedance return path. At that time, a new arc will be established between the conductor stub (in-feed side) and the steel pipeline. A rapid melt through of the pipeline's steel wall will result, and the pipeline contents will escape. Consequences of this may be very serious.

There is still no large change in the DEH in-feed current, and thus no indication of fault. A drop in pipeline pressure will be the first indication that something is wrong, but at that time the pipeline has already been ruptured.

The challenge before the present inventor thus was to establish an alternative DEH cable fault detection principle which will provide a clear fault indication before the pipeline may be damaged.

Conventional systems for protection of DEH cables comprise impedance protection and differential current protection. Both protection systems work by measuring electrical quantities at the in-feed end of the DEH system. Differential protection also requires measured current at the remote (sub sea) end.

Impedance protection is based on measuring the in-feed voltage in addition to the in-feed current, and thus becomes relatively robust with respect to voltage variations. However, it is considered that this method principally must leave a larger "blind zone" at the end or remote region discussed above, than the differential current protection.

Differential current protection is regarded as being the more robust, but the practical implementation is both costly and complicated. A current sensor is required at the remote end, together with communication back to the in-feed end, power supply etc. Further, it is principally impossible to completely eliminate the "blind zone" near the grounded end, as any practical measuring system will have a limited accuracy.

Detection of cable damage through the use of optical fibers is described in U.S. Pat. No. 6,559,437. The main objective of that patent is to provide a means of detecting mechanical damage to the cable insulation (e.g. by fraying, cutting or abrasion). Detection is achieved by placing an optical fiber sensor within the cable insulation and monitoring the condition of this sensor. The resulting fault detection system is said to be capable of detecting a fault manifested by "cutting or severing the fiber optic sensor, excessive pressure on the fiber optic sensor, or unduly high temperatures".

Optical fiber break detection could provide a means of detecting cable break within the remote end region. However, practical integration of a fiber optic sensor as described by U.S. Pat. No. 6,559,437 into the physically large DEH piggyback cable is considered non-feasible from a mechanical point of view. I.e. the practical handling of a fiber optic sensor during cable manufacturing, handling and installation would not be consistent with the capabilities of the optical fiber.

Commercial products exist for obtaining a temperature profile along an optical fiber. Roughly, the alternatives may be divided into two main categories: a) measurement of temperature at predefined sensor locations (e.g. Bragg gratings), and b) distributed measurements on a homogenous optical fiber. In principle, a local temperature increase at any location along the fiber may be detected by a category b) monitoring system. However, difficulties in fault detection on such basis will be serious, in particular at large DEH cable lengths.

The practical integration of an optical fiber element into a single core cable is described in EP0825465 (belonging to the present applicant). A number of optical fibers are enclosed by a common metal tube for the purpose of avoiding direct handling of the optical fibers during integration into the much larger single core cable. The fiber/tube element is oscillated (preformed) prior to insertion into the single core cable, making it capable of enduring the mechanical stress introduced by normal bending and handling of the cable. This EP patent specification does not touch upon the problem of fault detection in DEH cables.

Other examples of composite power cables with fiber optic elements for communication purposes are found in EP0539915 and EP0603604.

OBJECTS AND SUMMARY

On the above background the present invention relates to a fault detection system for subsea pipeline DEH cable, comprising fiber optic element(s) provided along the cable section concerned and located outside at least some of the cable insulation, said fiber optic element(s) being adapted to be influenced by fault inducing effects or damages to said cable section, so as to bring about an optical signal indicating a fault condition.

The novel and specific features according to this invention primarily consist therein that said fiber optic element(s) extend(s) inside a tubular, electrically conductive metal element adapted to melt down in the case of a fault current flowing therethrough as a result of damage to the cable insulation at a point along said cable section.

Referring to a preferred practical embodiment, the idea is to embed a number of optical fibers within the piggyback cable, with the fibers enclosed in a single metal tube. The use of an electrically conductive metal tube is advantageous, as this metal tube will act as an electrode at the early stages of cable fault escalation, thus accelerating the processes leading to fiber break. The proximity of the optical fibers to a cable fault will ensure that the fibers are broken before the pipeline has been damaged. Fiber break detection may be based on simple optical continuity through a looped fiber pair, or by more sophisticated methods like Optical Time Domain Reflectometry (OTDR). OTDR will in any case provide a simple method of fault locating once a fiber break has been detected. Redundancy is easily achieved by increasing the number of optical fibers employed, and additional optical fibers may provide a means of obtaining a temperature profile along the DEH cable system.

BRIEF DESCRIPTION OF THE DRAWINGS

In the following description reference is made to the drawings, of which:

FIG. 1 schematically shows a generic direct electric heating (DEH) system with fiber optic fault detection, FIG. 2 in cross section shows a typical piggyback cable design according to this invention, FIG. 3 in enlarged cross section shows an example of optical fibers enclosed in a tube, and FIG. 4 in cut-away, perspective view and somewhat simplified shows an end portion of a cable as illustrated in FIG. 2.

DETAILED DESCRIPTION

The piggyback cable design shown (FIG. 2) comprises a copper conductor 1 with a standard, triple extruded insulation system: conductor screen 2 (semi-conductive), cross-linked polyethylene (XLPE) insulation 3, and insulation screen 4 (semi-conductive). The steel tube 7a (see FIG. 3) containing the optical fibers 7 is preformed into a sinus shape (as shown in EP0825465) in order to achieve required bending properties, and is then placed onto the insulation screen 4 (see FIG. 4). One or more semi-conductive sheath(s) 9 is (are) then extruded over this assembly.

The steel tube/optical fibers 7a/7 component is a well known product as such, and has been found according to the present invention, to be particularly advantageous for fault detection as explained above. In addition to the above mentioned sinus shape of the steel tube 7a, the fiber optic element or elements 7 may have a similar meandering or oscillating configuration inside the tube. As also previously known, the tube 7a should be filled with a gel or the like in order to be pressure compensated for employment subsea.

When the piggyback cable 12 is in service, the conductor-to-ground voltage decreases linearly from a value at the in-feed end to zero at the remote end (as will be seen from curve 30 in the diagram at the bottom of FIG. 1). Consequently, the cable charging current also decreases linearly with distance to the in-feed end. The cable charging current flows to/from the semi-conductive insulation screen through the semi-conductive outer sheath(s). In normal service the metal tube element 7a will not substantially affect the radial cable charging current flow. The metal tube will carry an axial current induced by the conductor current, and must be capable of tolerating the associated power loss.

The diagram in FIG. 1 also indicates the blind zone 33 as discussed above.

If a piggyback cable damage occurs within the remote end or blind zone 33, exposing the copper conductor 1 to sea water, the metal tube element 7a will become an attractive path for the current flowing from the conductor 1 into seawater. Although the metal tube 7a has a small cross section area, its electric conductivity will be $10^6$-$10^7$ times higher than sea water and the semi-conducting screen 4 and sheath 9. This means that the metal tube will act as a collector of fault current, and the associated power loss will ensure that the tube is melted and the optical fibers 7 are exposed to the physical fault. At this time it may already be possible to detect changes in optical properties (e.g. signal damping). The probability of the optical fibers staying undamaged for any period of time is very small, given the proximity to the fault.

A main advantage of this invention is that it provides a method of detecting DEH cable faults under conditions for which no other solution is known in actual practice. More specifically the advantage of the system is that it directly detects detrimental activity, rather that trying to detect and interpret miniscule changes in electric current and/or voltage.

The invention claimed is:

1. Fault detection system for subsea pipeline DEH cable, comprising:
    fiber optic element(s) provided along a cable section located outside at least some of a cable insulation,
    a tubular, electrically conductive metal element, wherein said fiber optic element(s) extend along said cable inside said tubular, electrically conductive metal element,
    wherein said tubular electrically conductive metal element containing said fiber optic element(s) is arranged and dimensioned such that, in the case of a breach of said sub-sea pipeline cable with seawater entering said cable, said tubular electrically conductive metal element melts when a fault current flows therethrough; and
    wherein in the case of such a fault current, said optical fiber element(s) within said tubular electrically conductive metal element are arranged so as to be damaged by a melted portion of said electrically conductive metal element causing an optical signal in at least one of said optical fiber element(s) to indicate a fault condition.

2. Fault detection system according to claim 1, wherein said tubular metal element has a circular cross-sectional shape.

3. Fault detection system according to claim 1, wherein said fiber optic element(s) is(are) located outside a main part of said insulation and inside an outer sheath on the cable.

4. Fault detection system according to claim 1, wherein a semi-conductive layer is provided either inside, outside, or both inside and outside said fiber optic element(s).

5. Fault detection system according to claim 1, wherein said fiber optic element(s) has(have) a meandering or oscillating configuration inside said tubular metal element.

6. Fault detection system according to claim 1, wherein said tubular metal element has a meandering or oscillating configuration along the cable.

7. Fault detection system according to claim 4, wherein said semi-conductive layer is at least in part integral with said insulation.

* * * * *